(12) United States Patent
Paragios

(10) Patent No.: US 7,277,582 B2
(45) Date of Patent: Oct. 2, 2007

(54) USER INTERACTIVE LEVEL SET METHODS FOR IMAGE SEGMENTATION

(75) Inventor: Nikolaos Paragios, Plainsboro, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 734 days.

(21) Appl. No.: 10/727,452

(22) Filed: Dec. 4, 2003

(65) Prior Publication Data

US 2004/0202369 A1 Oct. 14, 2004

Related U.S. Application Data

(60) Provisional application No. 60/431,367, filed on Dec. 6, 2002, provisional application No. 60/520,450, filed on Nov. 14, 2003.

(51) Int. Cl.
*G06K 9/48* (2006.01)

(52) U.S. Cl. ...................... 382/199; 382/173

(58) Field of Classification Search ........... 382/199, 382/173

See application file for complete search history.

(56) References Cited

U.S. PATENT DOCUMENTS 7,079,674 B2 * 7/2006 Paragios et al. ............ 382/128
2003/0095121 A1 * 5/2003 Huseyin et al. ............. 345/423

* cited by examiner

*Primary Examiner*—Matthew C. Bella
*Assistant Examiner*—Mike Rahmjoo
(74) *Attorney, Agent, or Firm*—Donald B. Paschburg; F. Chau & Associates, LLC

(57) ABSTRACT

A method for boundary based image segmentation comprises segmenting an image, providing a level set representation of the segmentation for interaction, and providing an interactive edit of the level set representation. The method further comprises converting the interactive edit into a propagation constraint, and determining a segment according to the interactive edit and the level set representation.

18 Claims, 5 Drawing Sheets

USER INTERACTIVE LEVEL SET METHODS FOR IMAGE SEGMENTATION

This application claims the benefit of U.S. Provisional Application No. 60/431,367, filed Dec. 6, 2002, and U.S. Provisional Application No. 60/520,450, filed Nov. 14, 2003 entitled "User-Aided Boundary Delineation Through the Propagation of Implicit Representation", which are incorporated by reference herein in their entirety.

BACKGROUND OF THE INVENTION

1. Field of the Invention

The present invention relates to image segmentation, and more particularly to a system and method for image segmentation implementing an interactive level set.

2. Discussion of Related Art

Image segmentation approaches can be classified as boundary or region-based. Boundary-driven techniques rely on the generation of a strength image and the extraction of prominent edges, while region-based methods rely on the homogeneity of spatially localized features and properties. Snake-driven techniques are typically the most appropriate tool to derive boundary-based methods. A curve propagation technique is a common way to implement such terms.

To this end, a parameter space that defines a curve in the image plane is considered. Object extraction is equivalent with finding the lowest potential of an objective function. Such a function involves internal and external terms. The internal term enforces some desired geometric characteristics of the curve, while the external term moves the curve to the desired image features. Level set methods address such an objective in various application domains.

Level set formulations consider the problem in a higher dimension and represent the evolving curve as the zero-level set of an embedding function. The evolution of this function can then be derived in a straightforward manner from the original flow that guides the propagation of the curve. Such methods are implicit, intrinsic and topology free leading to a natural handling of important shape deformations.

An important limitation of level set formulations is sensitivity to noise and failing to capture/encode prior knowledge shape-driven on the structure to be recovered. A geometric flow that evolves the solution closer to the prior can introduce prior shape knowledge within the segmentation process. A more elegant formulation was derived in which such constraints were introduced in the form of energy components that constrain the solution space.

User-interaction is an important component in medical segmentation where boundary-tracing tools are implemented. User interaction can be considered as a different form of prior knowledge to be added in the segmentation process. Recent advances in medical imaging have increased the accuracy of automated techniques. However, clinical users typically need to correct their outcome. Although, level set methods are an established segmentation technique in medical imaging they do not support user interaction.

SUMMARY OF THE INVENTION

According to an embodiment of the present invention, a method for boundary based image segmentation comprises segmenting an image, providing a level set representation of the segmentation for interaction, and providing an edit point of the level set representation. The method further comprises converting the edit point into a propagation constraint, and determining a segment according to the edit point and the level set representation.

The edit point is one of a control point and a sequence of connected points.

Converting further comprises deriving a shape constraint within a level set framework wherein an interpolation converts the edit point into a closed structure.

The method comprises enforcing a smoothness constraint on the level set representation to correct a local discrepancy given the control point. The method comprises replacing a segment of the level set representation with an interaction segment according to the control point. The segment of the level set representation is determined to lie within a predetermined distance from the control point. The method comprises introducing the interactive segment, wherein the interactive segment is determined by a quadratic interpolation between the control point and the segment of the level set representation.

The sequence of connected points provides a number of control points in a clock-wise order that when connected define a closed curve. The method comprises recovering a global constraint that forces the level set representation to go through the number of control points.

The method comprises evolving the level set representation according to the propagation constraint. The method further comprises minimizing a distance between the evolving level set representation and the propagation constraint.

The propagation constraint is enforced more stringently closer to the control point.

The method comprises evolving the level set representation locally towards the propagation constraint.

According to an embodiment of the present invention, a program storage device is provided readable by machine, tangibly embodying a program of instructions executable by the machine to perform method steps for boundary based image segmentation. The method steps comprising segmenting an image, providing a level set representation of the segmentation for interaction, and providing an edit point of the level set representation. The method further comprises converting the edit point into a propagation constraint, and determining a segment according to the edit point and the level set representation.

According to an embodiment of the present invention, a method for image segmentation comprises providing a level set representation of an image segmentation for interaction, requesting user-interaction for editing the level set representation, determining a propagation constraint according to the user-interaction, and determining an evolved level set representation, wherein a portion of the evolved level set representation is locally affected by the propagation constraint.

The user-interaction is one of a control point and a sequence of connected points. The method further comprising enforcing a smoothness constraint on the level set representation to correct a local discrepancy given the user-interaction.

The portion of the evolved level set representation replaces a corresponding portion of the level set representation. The portion segment of the level set representation is determined to lie within a predetermined distance from the user-interaction.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

According to an embodiment of the present invention, user-defined segmentation constraints can be implemented within level set methods. Snake-driven methods are powerful and widely explored techniques for object extraction. A level set representation is a mathematical framework technique to implement snake-driven methods. This formulation is implicit, intrinsic and parameter/topology free. User interactive constraints are a form of prior shape knowledge. To this end, a formulation is implemented that converts user interaction to objective function terms that guide and improve the segmentation through the user edits.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 1:
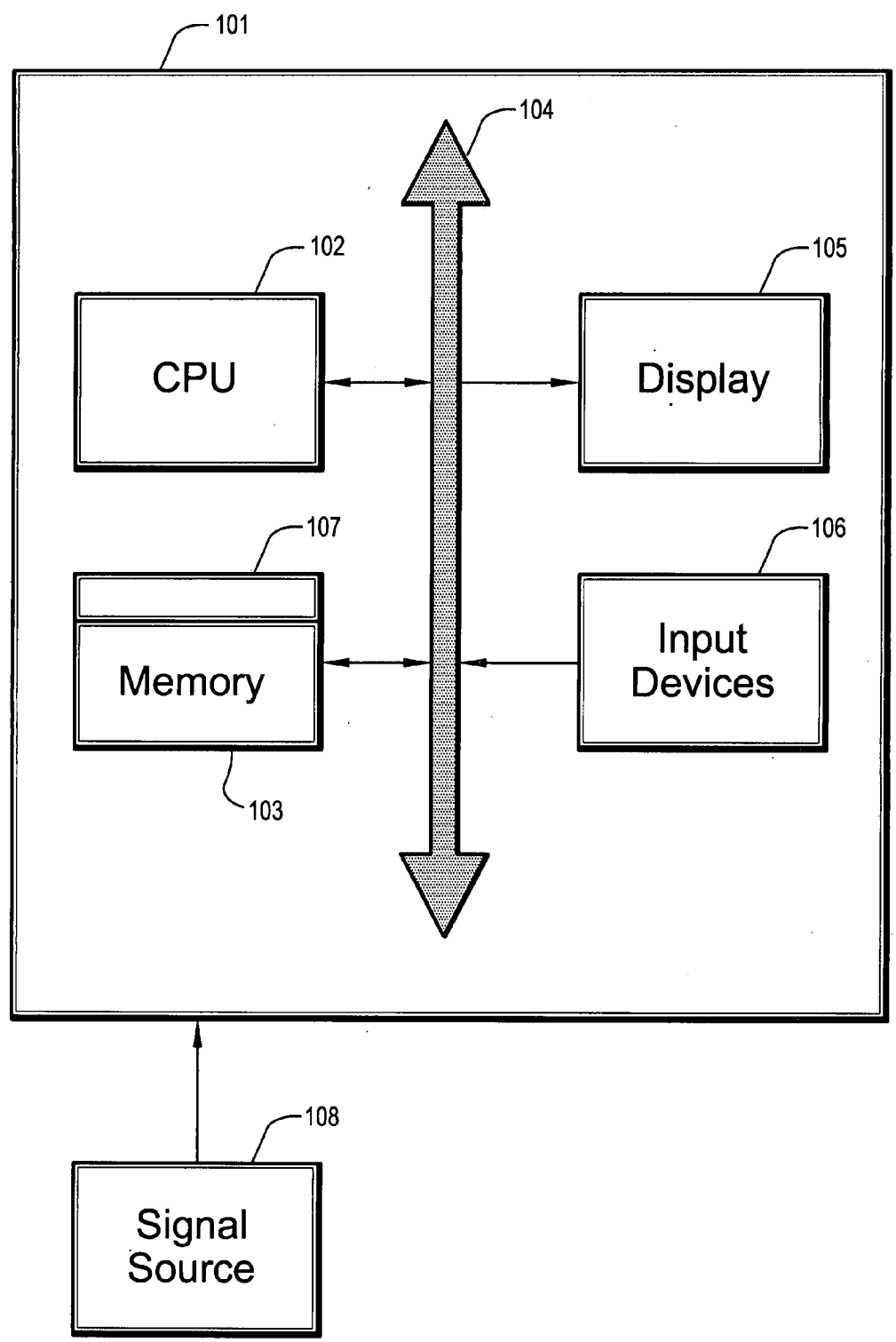
FIG. 1 is a diagram of a system according to an embodiment of the present invention.

Referring to FIG. 1, according to an embodiment of the present invention, a computer system 101 for implementing the present invention can comprise, inter alia, a central processing unit (CPU) 102, a memory 103, and an input/output (I/O) interface 104. The computer system 101 is generally coupled through the I/O interface 104 to a display 105 and various input devices 106 such as a mouse and keyboard. The support circuits can include circuits such as cache, power supplies, clock circuits, and a communications bus. The memory 103 can include random access memory (RAM), read only memory (ROM), disk drive, tape drive, etc., or a combination thereof. The present invention can be implemented as a routine 107 that is stored in memory 103 and executed by the CPU 102 to process the signal from the signal source 108. As such, the computer system 101 is a general-purpose computer system that becomes a specific purpose computer system when executing the routine 107 of the present invention.

The computer platform 101 also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

According to an embodiment of the present invention, a term encodes user-interaction within level set methods. This term is introduced in the form of an evolving shape prior and transforms user-edits into level set-based propagation constraints.

Figure 2:
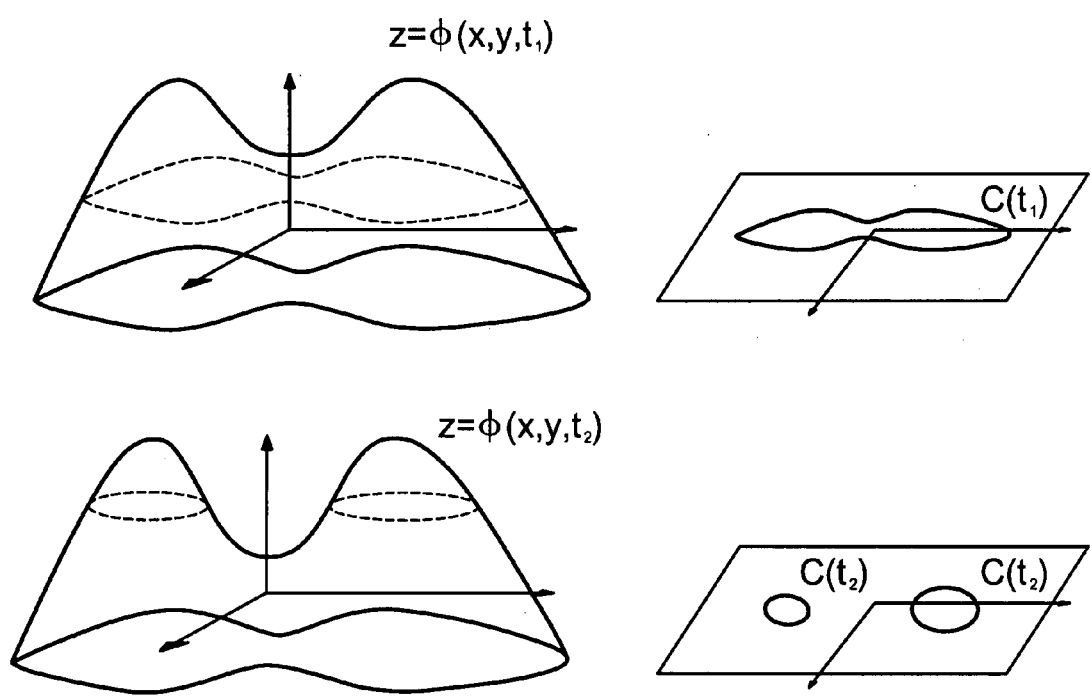
FIG. 2 is an illustration of level set representations and evolving surfaces according to an embodiment of the present invention.

For level set representations (see FIG. 2), the level set method comprises representing and evolving an evolving curve $\partial R(p)$ with the zero-level set of an embedding surface $\Phi : \Omega \rightarrow R$:

$$\Phi(p;t) = \begin{cases} 0, & p \in \partial R(t) \\ +D((p), \partial R(t)) > 0, & p \in R(t) \\ -D((p), \partial R(t)) < 0, & p \in [\Omega - R(t)] \end{cases}$$

where $\Omega$ is the image domain (bounded) and $D(p,\partial R(t))$ is the minimum Euclidean distance between the pixel p and the curve $\partial R(t)$. The level set formulation can be considered as an optimization framework. To this end, the approximations of Dirac and Heaviside distributions can be defined as:

$$\delta_\alpha(\phi) = \begin{cases} 0, & |\phi| > \alpha \\ \frac{1}{2\alpha}\left(1 + \cos\left(\frac{\pi\phi}{\alpha}\right)\right), & |\phi| < \alpha \end{cases}$$

$$H_\alpha(\phi) = \begin{cases} 1, & \phi > \alpha \\ 0, & \phi < -\alpha \\ \frac{1}{2}\left(1 + \frac{\phi}{\alpha} + \frac{1}{\pi}\sin\left(\frac{\pi\phi}{\alpha}\right)\right), & |\phi| < \alpha \end{cases}$$

These functions could be used to define contour-based and region-based energetic terms in the level set space:

$$\underbrace{\int\int_\Omega H_\alpha(\Phi(p))r(I(p))dxdy,}_{\text{regional module}} \qquad (i)$$

$$\underbrace{\int\int_\Omega \delta_\alpha(\Phi(p))b(I(p))|\nabla\Phi(p)|dxdy,}_{\text{boundary module}} \qquad (ii)$$

where r and g are region and boundary positive monotonically decreasing data-driven functions. The first term [i] is a grouping component that accounts for some regional properties (modulo the definition of r) of the area defined by the evolving curve. The second term [ii] is a combination of a boundary attraction term (modulo the definition of b) and a smoothness component.

Figure 3A:
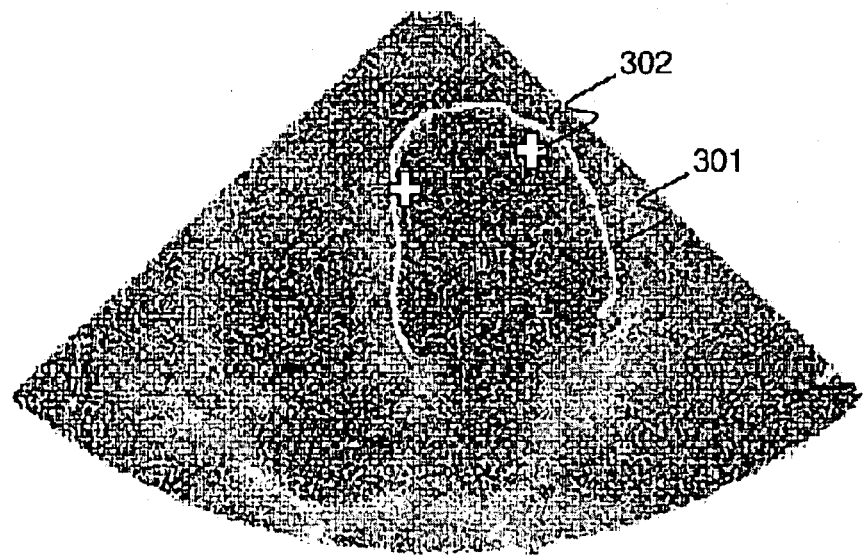
FIGS. 3a-3b are segmentation images according to an embodiment of the present invention.
Figure 3B:
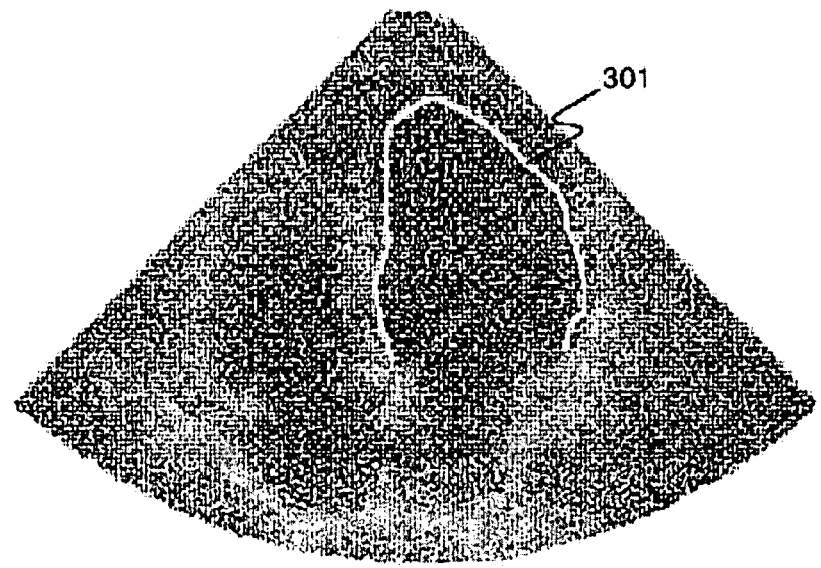

For user-interactive constraints, segmentation techniques need local corrections when the visual information does not support the user-preferred solution. User interaction can address this issue. One can consider the case of ultrasonic images. The low signal-to-noise ratio can lead to segmentation discrepancies. Correcting these results can take less time than the complete hand drawing of the cardiac contours. The user interaction can be in the form of points indicated on a level set representation to define important elements or mis-detected structures. FIG. 3a shows an example of a segmentation of a heart 301 and user input points 302. FIG. 3b shows an example of the segmentation 301 using the user input points as constraints. One of ordinary skill in the art would appreciate that other methods of interaction can be implemented, such as a touch screen showing a segmented image.

Level set methods perform propagation at the pixel level and therefore can account for important local deformations, but can be sensitive to noise. User interactive editing tools can be considered either as local or global constraints. The constraints are implemented in an editing procedure to perform correction on the recovered solution. To this end, the user is asked to introduce a constraint on important or miss-classified parts of the segmentation map.

Two forms of interaction are considered here for purposes of explanation. A first interaction uses a one or more individual control points for correcting local discrepancies, while a second interaction uses a sequence of connected points. To derive shape constraints within a level set framework, a linear or quadratic interpolation is used to convert the user edits into closed structures (e.g., shapes).

Figure 4:
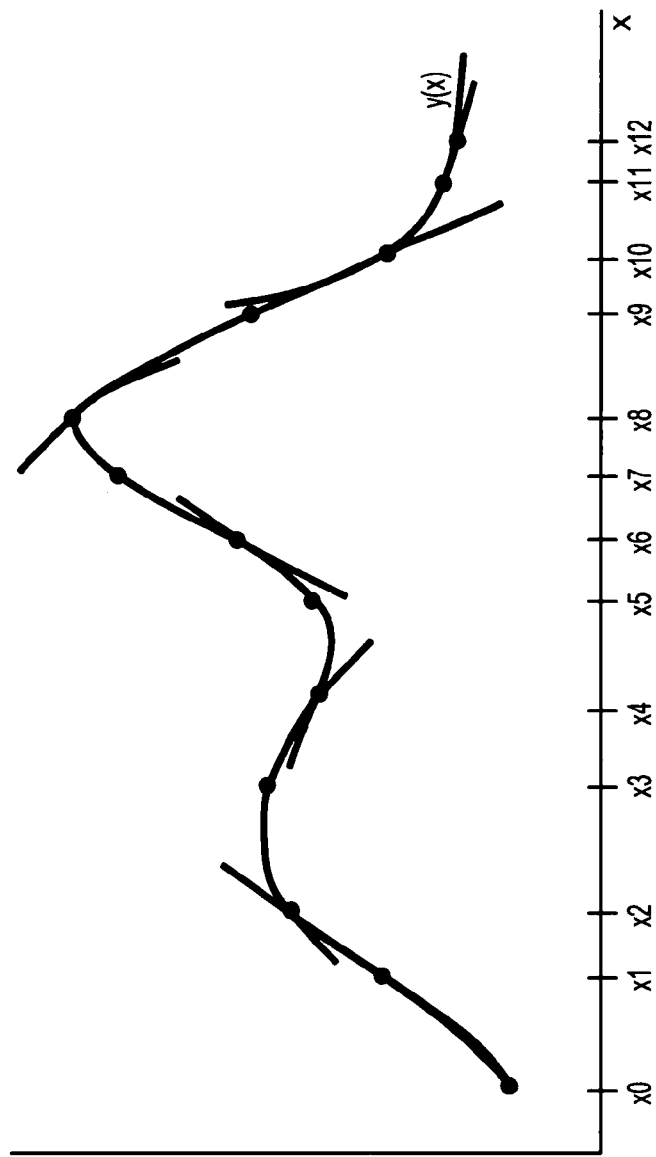
FIG. 4 is a graph of a quadratic interpolation according to an embodiment of the present invention.
Figure 4:
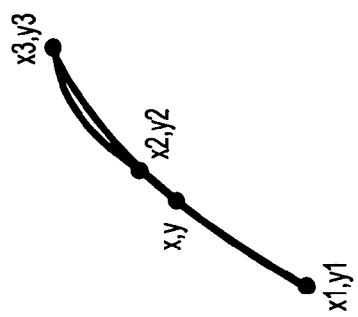

For the construction of a constraint, a quadratic interpolation (see FIG. 4) determines the value of a function at an unknown intermediate point given three data points. That is equivalent with fitting a parabola to the three data points $$y = Ax^2 + Bx + C$$

where A, B, and C are unknowns to be recovered. The data points, $(x_{i-1}, y_{i-1}), (x_i, y_i)$, and $(x_{i+1}, y_{i+1})$ must all lie on the curve and are used to determine A, B, and C. The determinants can be used to recover these parameters:

$$A = \frac{\Delta_x}{\Delta}, B = \frac{\Delta_b}{\Delta}, C = \frac{\Delta_c}{\Delta}$$

where $$\Delta = \begin{vmatrix} x_{i-1}^2 & x_{i-1} & 1 \\ x_i^2 & x_i & 1 \\ x_{i+1}^2 & x_{i+1} & 1 \end{vmatrix}, \Delta_a = \begin{vmatrix} y_{i-1} & x_{i-1} & 1 \\ y_i & x_i & 1 \\ y_{i+1} & x_{i+1} & 1 \end{vmatrix},$$

$$\Delta_b = \begin{vmatrix} x_{i-1}^2 & y_{i-1} & 1 \\ x_i^2 & y_i & 1 \\ x_{i+1}^2 & y_{i+1} & 1 \end{vmatrix}, \Delta_c = \begin{vmatrix} x_{i-1}^2 & x_{i-1} & y_{i-1} \\ x_i^2 & x_i & y_i \\ x_{i+1}^2 & x_{i+1} & y_{i+1} \end{vmatrix}$$

Constraints can be; (i) independent control points and (ii) multiple connected control points provided in a clock-wise order.

For user interaction using a single control point, segmentation maps can fail to capture important details due to the absence of strong visual support. This limitation can be addressed by enforcing the solution to go through such a problematic segment. According to an embodiment of the present invention, ($\hat{p}$) is provided by the user and smoothness constraints on the solution are used to correct such local discrepancies.

The solution can be improved locally by replacing a small segment of the actual solution with the interactive part. Therefore, given a point ($\hat{p}$) the curve points that lie within a distance d are considered. The use of distance maps as embedding function for the level set representations, provide a straightforward manner to determine these points $$N_{\hat{p}} = \{p_i \in \Omega : |\Phi(p) - d| < \delta\}$$

where $\delta \leftarrow 0$. For convex shapes and control points that lie on the object, it can be proved that $N_{\hat{p}}$ comprises two points for a reasonable small selection for d. Such assumption does not hold for any shape. Therefore, more than two points can satisfy the constraint. To introduce the interactive segment, only two points of the curve will be considered. The points with maximum angular separation at ($\hat{p}$) are selected:

$$(p_1, p_r) : \arg\max_{\{i,j\}} |p_i - p_j|$$

$$(p_i, p_j) \in N_{\hat{p}} \times N_{\hat{p}}$$

A quadratic interpolation is performed between $(p_1, p_r, \hat{p})$ and the interactive segment is determined. Within the level set representations, the current position of the curve is recovered from the zero-level set of the embedding function. The curve points are four-connected (zero-crossings on the image plane), and using a connected component rule, recovered in a clock-wise order;

$$\partial R = (p_0, \ldots, p_r, \ldots, p_1, \ldots, p_N)$$

where $p_0$ is an arbitrary selected point. Towards introducing the interactive segment, the segment between $p_1$ and $p_r$ is replaced with the one determined by the quadratic interpolation between the control point $\hat{p}$ and $p_1$ and $p_r$;

Such a shape can be embedded in a level set function using the Euclidean distance as embedding function;

$$\Phi_c(p) = \begin{cases} 0, & p \in \partial UI \\ +D(p, \partial UI) > 0, & p \in R_{UI} \\ -D(p, \partial UI) < 0, & p \in [\Omega - R_{UI}] \end{cases}$$

Such a representation encodes the user edits in a global fashion using the existing solution in areas where user interaction is absent where important deviations from the constraint should be tolerated. The distance between the control point and the image plane is an indicator for the importance of the constraint.

$$\sigma_C(p) = 1 + |p - \hat{p}|, p \in \Omega$$

Such a measure will be small for the area around the interactive segment while being significant for the segments that are far from the user edits. The same principle can be used to account for multiple, independent user edits.

For user interaction using multiple control points, a data-driven solution may not recover a meaningful segmentation map and to correct errors a large amount of local interaction is needed. Global constraints are a different form of user-interaction that can guide the segmentation process from the beginning. An exemplary scenario is the following: the user provides a minimum number of control points in a clock-wise order $(\hat{p}_1, \ldots, \hat{p}_N)$ that when connected define a closed curve.

The objective is to recover a global constraint that forces the recovered solution to go through the control points. The original function can be approximated in a piecewise fashion. For any y over the entire domain of x, a segment is selected to perform the interpolation. Since the shape functions are only defined on each element we can approximate y by:

$$y(x) = \alpha_{i-1}(x) y_{i-1} + \beta_i(x) y_i + \gamma_i(x) y_{i+1}$$

where $\hat{p}_i=(x_i,y_i)$ and $$\alpha_{i-1}(x) = \frac{(x_{i+1}-x_i)(x_{i+1}-x)(x-x_i)}{\Delta}$$

$$\beta_i(x) = \frac{-(x_{i+1}-x_{i-1})(x_i-x)(x-x_{i-1})}{\Delta}$$

$$\gamma_{i+1}(x) = \frac{(x_i-x_{i-1})(x_i-x)(x-x_{i-1})}{\Delta}$$

This procedure can convert user interaction into a closed structure (e.g., shape) $R_{UT}$. The level set representation $\Phi_C$ of this structure can be considered to enforce the user input. The importance of the constraint varies across the image domain and at a given image location is inversely proportional to the minimum distance from the set of control points:

$$\sigma_C(p)=1+\arg\min_i|p-\hat{p}_i|, p\in\Omega, i\in[1,N]$$

The user-edits are taken into account when the evolving level set representation becomes similar to the one derived from the constraint. To this end, the distance between the constraint and the evolving representation $\Phi$ is considered:

$$E(\Phi)=\int\int_\Omega H_\alpha(\Phi(x,y))(\Phi(x,y)-\Phi_C(x,y))^2 d\Omega$$

that is equivalent with seeking a curve that goes through the user-defined seed points. This is done by minimizing the distance between the evolving curve and the interactive constraint.

During the model construction, the importance of the user-interactive is determined according to the distance from the control points. The constraint is enforced more stringently closer to the user seeds while considering the data to guide the segmentation process when there is no input from the user. The distance between the constructed prior and the control points of the constraint can be used to implement such strategy;

$$E_{interaction}(\Phi) = \int\int_\Omega H_\alpha(\Phi(x,y))\frac{(\Phi(x,y)-\Phi_C(x,y))^2}{\sigma_C^2(x,y)}d\Omega$$

The user interaction is optimally considered when finding the $\Phi$ that corresponds to the lowest potential of the objective function. The calculus of variations within a gradient descent method can be used to determine the optimal flow that forces the evolving curve to respect the user-defined constraints;

$$\frac{d}{dt}\Phi = \underbrace{-2H_\alpha(\Phi)\frac{\Phi-\Phi_C}{\sigma_C^2}}_{\text{user-interaction force}} \underbrace{-\delta_\alpha(\Phi)\frac{(\Phi-\Phi_C)^2}{\sigma_C^2}}_{\text{deflation force}}$$

This flow comprises two terms. The first term evolves the curve locally towards the preferred topology as defined by the user. The second term is a constant deflation force that tends to shrink the curve and consequently minimize the objective function. Therefore, the second term—the deflation component—can be ignored, and only the first term is used to account for the user interaction. The flow enforces the preferred topology in a qualitative fashion. The variability ($\sigma_C$) of the interaction constraint is used to downscale the effect of the term in image locations where the user input is not strong. Propagation/segmentation in these areas will be data-driven. An image-based term for segmentation is defined. Several variational frameworks have been proposed for image segmentation.

For user-interactive geodesic active regions, the geodesic active contour can be used for example to perform boundary extraction.

$$E_{boundary}(\Phi)=\int\int_\Omega \delta_\alpha(\Phi)b(|\nabla I|)\nabla\Phi|d\Omega$$

where $b:R^+\to[0,1]$ is a monotonically decreasing function. The lowest potential of this functional corresponds to a minimal length geodesic curve attracted by the boundaries of the structure of interest. Regional/global information can improve performance of boundary-based flows that suffer of being sensitive to the initial conditions. The central idea behind this module is to use the evolving curve to define an image partition that is optimal with respect to some grouping criterion. The Mumford-Shah framework has been used frequently within level set formulations as global region-based grouping term using piece-wise constant functions;

$$E_{region}(\Phi)=\int\int_\Omega H_\alpha(\Phi)(I-\mu 0)^2+(1-H_\alpha(\Phi))(I\mu_B)d\Omega$$

where $\mu_B,\mu_0$ is the mean intensity for the background and the object region. The distance from the mean value is considered as a region descriptor. The mean values are dynamically updated according to the evolving segmentation map.

Integration of the boundary and the region-driven term can be considered to perform segmentation, namely the geodesic active region model. In the absence of noise, occlusions, and corrupted visual information, such method can be efficient and deal with local deformations. One can also integrate the visual terms with the user-interactive constraint when available as follows;

$$E(\Phi)=w_1 E_{boundary}(\Phi)+w_2 E_{region}(\Phi)+w_3 E_{interaction}(\Phi)$$

The calculus of variations as shown earlier for each component separately, will provide a curve propagation flow that integrates visual support and user interaction. Modification of the user preferences can update the constraint on the fly. A solution derived from the visual terms is recovered and then the user-introduce seeds (points) for corrections. Such interaction is then converted to propagation force and refines the segmentation map towards the user-preferred solution with minimal edits. It is important to note that user interaction is introduced in the form of soft-to-hard constraint. The result is a segment having an equilibrium between the user edits and the solution provided by the data.

Figure 5:
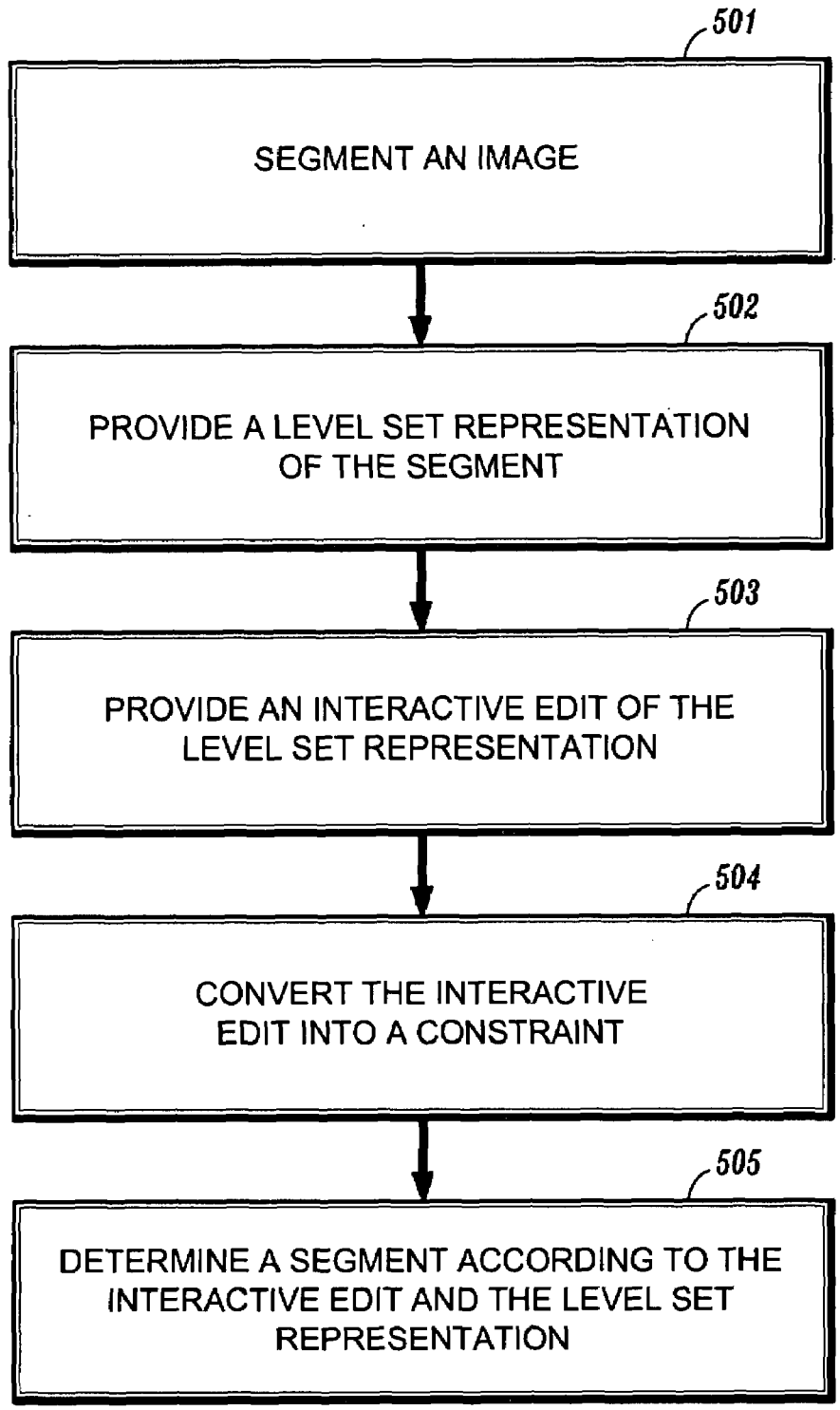
FIG. 5 is a flow chart of a method according to an embodiment of the present invention.

Referring to FIG. 5, a method for boundary based image segmentation comprises segmenting an image 501, providing a level set representation of the segmentation for interaction 502, and providing an interactive edit of the level set representation 503. The method comprises converting the interactive edit into a propagation constraint 504, and determining a segment according to the interactive edit and the level set representation 505.

According to an embodiment of the present invention, a framework for user-interaction within the propagation of curves uses level set representations. Segmentation techniques based on the propagation of curves are very popular in image processing and computer vision. Level set methods are an emerging formulation to implement these techniques with certain strengths as well as some limitations.

Important local deformations as well as topological changes can be captured by these techniques. At the same time, they refer to an implicit geometry where local properties of the evolving curve can be easily determined.

Although, some of the limitations of these methods—like their inability to account for prior knowledge—have been dealt with, no know system or method addresses user interaction. According to an embodiment of the present invention, interactive editing is converted into propagation constraints that force the solution to respect the user edits. The construction of such constraints is simple and does not require additional computational resources.

Experimental results demonstrate the potentials of a method for interactive segmentation. The user edits can correspond to the crosses that appear in the image. To this end, a medical example has been considered, the segmentation of the left ventricle in polar for ultrasonic images. This modality suffers from high signal-to-noise ratio and visual support is not sufficient to provide accurate segmentation results. Global interactive constraints have been used to improve segmentation performance of the polar domain.

Having described embodiments for an interactive level set driven image segmentation, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A method for boundary based image segmentation comprising:
   an initial segmentation of an image;
   providing a level set representation of the segmentation for interaction;
   providing one or multiple user defined edit points in the image;
   converting the edit point into a propagation constraints; and
   determining the final segmentation according to the converted to constraints edit points and the level set representation.

2. The method of claim 1, wherein the edit point is one of a control point and a sequence of connected points.

3. The method of claim 2, further comprising enforcing a smoothness constraint on the level set representation to correct a local discrepancy given the control point.

4. The method of claim 2, further comprising replacing a segment of the level set representation with an interaction segment according to the control point.

5. The method of claim 4, wherein the segment of the level set representation is determined to lie within a predetermined distance from the control point.

6. The method of claim 4, further comprising introducing the interactive segment, wherein the interactive segment is determined by a quadratic interpolation between the control point and the segment of the level set representation.

7. The method of claim 2, wherein the sequence of connected points provides a number of control points in a clock-wise order that when connected define a closed curve.

8. The method of claim 7, further comprising recovering a global constraint that forces the level set representation to go through the number of control points.

9. The method of claim 1, wherein converting further comprises deriving a shape constraint within a level set framework wherein an interpolation converts the edit point into a closed structure.

10. The method of claim 1, further comprising evolving the level set representation according to the propagation constraint.

11. The method of claim 10, further comprising minimizing a distance between the evolving level set representation and the propagation constraint.

12. The method of claim 10, further comprising evolving the level set representation locally towards the propagation constraint.

13. The method of claim 1, wherein the propagation constraint is enforced more stringently closer to the control point.

14. The method of claim 1, wherein the user-interaction is one of a control point and a sequence of connected points.

15. The method of claim 14, further comprising enforcing a smoothness constraint on the level set representation to correct a local discrepancy given the user-interaction.

16. The method of claim 14, further comprising the portion of the evolved level set representation replaces a corresponding portion of the level set representation.

17. The method of claim 16, wherein the portion segment of the level set representation is determined to lie within a predetermined distance from the user-interaction.

18. A program storage device readable by machine, tangibly embodying a program of instructions executable by the machine to perform method steps for boundary based image segmentation, the method steps comprising:
   an initial segmentation of an image;
   providing a level set representation of the segmentation for interaction;
   providing; one or multiple user defined edit points in the image
   converting the edit point into a propagation constraints; and
   determining the final segmentation according to the converted to constraints edit points and the level set representation.

* * * * *